United States Patent [19]

Edgren et al.

[11] Patent Number: 4,513,106

[45] Date of Patent: Apr. 23, 1985

[54] PROCESS FOR EXPANDING MICROSPHERES

[75] Inventors: Anders Edgren; Jan Söderberg; Bengt Bergström, all of Sundsvall, Sweden

[73] Assignee: KemaNord AB, Stockholm, Sweden

[21] Appl. No.: 554,313

[22] Filed: Nov. 22, 1983

[30] Foreign Application Priority Data

Nov. 26, 1982 [SE] Sweden ................................ 8206733

[51] Int. Cl.$^3$ ................................................ C08J 9/22
[52] U.S. Cl. ........................................ 521/58; 264/53; 264/DIG. 9; 521/56; 521/60
[58] Field of Search .............................. 521/56, 58, 60; 264/DIG. 9, 53

[56] References Cited

U.S. PATENT DOCUMENTS 2,944,292  7/1960  Norrhede ................... 264/DIG. 9
3,914,360 10/1975  Gunderman .......................... 521/56

Primary Examiner—Morton Foelak
Attorney, Agent, or Firm—Fred Philpitt

[57] ABSTRACT

A process for expanding expandable thermoplastic microspheres containing a blowing agent which will be volatilized at heating. A slurry of the unexpanded spheres is fed to a pressure zone together with steam whereby volatilization of the blowing agent occurs in the zone and the expanded microspheres are then allowed to leave the zone at a considerable pressure drop.

8 Claims, No Drawings

PROCESS FOR EXPANDING MICROSPHERES

TECHNICAL FIELD

The present invention relates to a process for expanding thermoplastic microspheres of the kind which contain a blowing agent which is vaporized at heating.

BACKGROUND OF THE INVENTION

At the production of expandable microspheres a liquid suspension of thermoplastic particles is obtained and the particles contain an encapsulated liquid blowing agent. The unexpanded particles can be used as such, they can for example be mixed into different products for later expansion by heating. However, the expansion can also be carried out on an industrial scale before the spheres are mixed into any product or used in another way.

The actual expansion process is, however, not free from problems. It is desirable to use a high temperature to get a uniform and rapid expansion as well as maximum decrease in density due to great gas expansion and softened thermoplastic shell. However, the softening of the thermoplastic material also leads to a risk for particle shell weakening and to a mutual particle agglomeration. The agglomeration tendency increases with the time the particles are in contact with each other in a heated condition. If large suspension media amounts are used to avoid agglomeration there will instead be problems with the moisture content of the final product. Problems with agglomeration can also arise at heating in connection with drying of the particles, for example when the suspension liquid is dried off. If the microspheres are rapidly cooled with water to avoid agglomeration a conflict will arise with the need to avoid substantial drying.

Further problems arise with the application of heat in connection with the expansion. The expanded particles have a considerably higher thermal insulating effect than the unexpanded particles and this can make a complete and uniform expansion of the entire quantity of microspheres more difficult. Also the drying of microspheres by means of heating is more difficult for the same reasons. If attempts are made to avoid these problems by finely atomizing the particles there will be economical problems due to the necessity for larger equipment volumes.

Several different methods to carry out the expansion have been disclosed. The U.S. Pat. No. 3,611,583 suggests that the slurry of microspheres be spread out in a thin layer on a belt with subsequent application of heat. Even if the layer is very thin it cannot be avoided that heat supply to the central parts of the mass is less good than to the parts close to the surface. Further, in this method the particles will be in contact with each other for a fairly long time in heated condition and this gives a high risk of agglomeration. The U.S. Pat. No. 3,779,951 suggests that glycols be used as lubricant for the particles to avoid agglomeration. Besides the fact that in most cases this method gives an addition of an undesirable component to the microspheres, it does not solve the problem of obtaining a uniform supply of heat. According to the U.S. Pat. No. 3,914,360 the microspheres are expanded by being conveyed through a heated static mixer. Although the continuous mixing improves the heat transfer this will not be complete due to the insulating effect of the expanded particles. Further, there is nothing in this process that will prevent a continuous agglomeration between the particles during the expansion phase or in the obtained warm cake of expanded spheres. The Swedish patent application No. 8100181-0 suggests atomization a slurry of microspheres in a hot, inert gas whereby the spheres are dried and then expanded in a dispersed condition forming a free-flowing product. However, this process requires large gas- and apparatus volumes. There is also a commercial method according to which, the slurry is fed to a pipe together with steam whereby the particles expand. The disadvantage of this method is that the expanded particles leaving the pipe will have to be cooled directly with water in order not to agglomerate and this addition of water, in combination with the comparatively low dry content of the feed slurry, results in a final product having unsatisfactory low dry content. If cooling water is not used or is replaced by cooling air or a cooled apparatus mantle a product of fused particles will be obtained.

THE INVENTION GENERALLY

It is an object of the present invention to avoid the above mentioned problems. It is a special object of the invention to make it possible to have a uniform and complete expansion of expandable microspheres, forming a uniform product free from agglomerated microspheres. A further object is to make it possible to expand the microspheres to a product of high dry content without using a special drying step. Still another object of the invention is to make it possible to achieve these advantages using small apparatus volumes and simple equipment in a continuous process.

These objects are achieved by means of the characteristic features given in the patent claims.

By contacting a slurry of the microspheres with steam a uniform supply of heat to the particles is ensured, even after the expansion of the particles has started. The heat transfer between the particles and the steam is rapid and efficient and this means that the required heating of the particles can be carried out within a very small zone and thus in a very small apparatus volume. As the heat transfer is rapid, a cooling phase can follow soon after the expansion phase which reduces the agglomeration risk. Since the steam is introduced directly to the slurry in a pressure zone there will be no real dispersion of the unexpanded or the expanded particles in a gas phase, but the mass will be kept together during the expansion phase and this contributes to keeping the apparatus volume and the steam consumption low. The use of a pressure zone also means that the friction losses when the expanded mass flows through the zone make up only a small part of the total prssure which allows feeding slurries of comparatively high dry contents. Outflow over a considerable pressure reduction means that the particles will accelerate strongly at the outlet and leave this with a high speed. At the same time the pressure drop will give the particles a rapid and fairly great additional expansion at the outflow and this, together with the increase in speed, disintegrates the outflowing mass to separate particles. The mutual contact between the particles is hereby broken and there can no longer be any agglomeration. Further, the expansion consumes heat and this contributes to the cooling. By the disintegration and the rapid outflow a strong interaction with the surrounding medium is also obtained so that each particle will be cooled rapidly and also dried at the evaporation of steam. This rapid cooling further reduces the agglomeration risk and the risk of other damage to the sphere shells, and at the same time the drying results in a final product having only a minor amount of retained water.

Further object and advantages of the invention will be evident from the detailed description below.

DETAILED DESCRIPTION OF THE INVENTION

Expandable microspheres, their production and use are disclosed in the U.S. Pat. No. 3,615,972. The thermoplastic shell of these particles can for example consist of polymers or copolymers formed from monomers such as vinyl chloride, vinylidene chloride, acrylonitrile, methacrylate or styrene. The particle size of the unexpanded spheres, and thus also of the expanded spheres, can vary within wide limits and is selected with respect to the desired properties of the finished product. Particle sizes for unexpanded spheres can for example be 1 $\mu$m to 1 mm, preferably 2 $\mu$m to 0.5 mm and particularly 5 $\mu$m to 50 $\mu$m. The diameter of the particles increase at expansion by a factor 2 to 5. The unexpanded spheres contain volatile, liquid blowing agents which are vaporized at heating. These blowing agents can for example be freons such as trichlorofluoromethane, hydrocarbons such as n-pentane, i-pentane, neo-pentane, butane, i-butane or other blowing agents conventionally used for this type of microspheres. The blowing agent may suitably make up 5 to 30 percent by weight of the weight of the microspheres. Expancel ® is an example of a suitable, commercially available microsphere product which has a thermoplastic shell of a vinylidene/acrylonitrile copolymer and contains iso-butane as a blowing agent.

The expanded particles can be used in several fields of application whenever their expandable properties, low density, flexibility or other properties are valuable, for example in printing inks for embossed print, as fillers in plastic materials and paper and as additives to paints and putties.

When the microspheres are fed to the pressure zone they should be in a slurry since this facilitates their transport and the pumpability. Any liquid which is inert with respect to the spheres can be used as slurrying agent. If a dry final product is desired the slurrying agent should be volatile. Water is a preferred slurrying agent. Since the unexpanded microspheres normally are obtained in the form of an aqueous slurry at their production such a product can advantageously be used directly in the process of the invention, optionally after an adjustment of the dry content. The lower limit for the dry content of the feeding slurry is mainly set by the desired dry content of the final product. The upper limit is essentially decided by the pumpability of the slurry before the expansion and by the transportability of the mass through the pressure zone after the expansion and also with respect to the risk of agglomeration. It is much easier to avoid sintering and other deformation of the microspheres in connection with the expansion at low dry contents than at high dry contents. The sintering risk is greatest after the expansion due to the considerable particle surface increase obtained at the expansion results in a corresponding reduction of the liquid layer between the particles. The highest possible dry content is also to a certain extent dependent on the expansion degree of the particles. For particles, which as mentioned above expand linearly 2 to 5 times and particularly between 3 and 4 times, dry contents of from 5 to 45 percent by weight are suitable in the process of the invention preferably between 10 and 30 percent by weight most preferably dry contents of between 15 and 25 percent by weight are used.

In addition to the slurry of microspheres, steam shall be fed to the pressure zone. The amount of steam and the temperature of the steam should be sufficient for heating the microspheres to a temperature above the volatilization temperature of the blowing agent at the pressure existing in the pressure zone and for expanding the particles in this zone. The volatilization temperature varies with the used termoplastic material and the blowing agent that is used but it is normally within the range of from 80° to 150° C., and particularly from 90° to 120° C., and the temperature in the pressure zone should thus be kept within this range. It is suitable to introduce an excess of steam relative to the amount corresponding to the minimum energy content required to raise the temperature and volatilize the blowing agent. An excess of steam speeds up the heat transfer, improves the stability of the expansion process and maintains a gas phase in the zone which facilitates the feeding of the expanded mass and the disintegration of this when it leaves the pressure zone. An excess of between 1.5 and 10 times the minimum required amount is suitable and it is particularly preferred to have an excess of between 2 and 5 times this amount. The steam pressure shall of course be higher than the existing pressure in the zone and the feeding of steam and feeding of the slurry by pumping can be used to control the pressure in the zone.

It can be advantageous to replace a part of the amount of steam by a smaller amount of air or other inert gas in order to stabilize the pressure in the pressure zone, to control the pressure and temperature, to control the expansion degree of the spheres and to avoid a too high expansion. The amount of inert gas can then be between 0.1 and 1 times the weight amount of introduced steam and particularly between 0.2 and 0.5 times the amount of steam.

The pressure in the pressure zone should be below the vapour pressure of the blowing agent in liquid form so that at least the vaporization heat is supplied to the zone while a complete expansion should not take place in the zone. The highest possible pressure is thus to a high degree decided by the blowing agent used. However, generally the pressure is below 3 MPa and suitably also below 1.5 MPa. In order to obtain a sufficiently strong acceleration and expansion at the outlet of the pressure zone the overpressure in the zone should not be below 0.01 MPa, it shall suitably be above 0.05 MPa, preferably also above 0.1 MPa and most preferably above 0.3 MPa.

Since an excess of heat energy is normally supplied to the pressure zone care should be taken that the residence time in the zone will not be so long as to cause an overheating of the expanded microspheres. For normal thermoplastic materials the temperature should thus not be allowed to be above 200° C. and preferably not above 180° C. The minimum residence time is decided with respect to the requirement that the blowing agent should be completely vaporized in the zone so that a uniformly expanded product is obtained after the outflow from the zone.

When the expanded particles leave the pressure zone they are exposed to a pressure drop corresponding to the difference in pressure between the zone and the surrounding environment. At the pressure drop an additional expansion of the particles takes place at the same time the flow will accelerate. In order to maximally use these effects for disintegration of the particle flow and for mutual particle separation the pressure drop should take place rapidly and over only a short distance in the flow direction, suitably by means of a restriction at the end of the pressure zone. As both the disintegration and the cooling of the stream occur very rapidly after the outflow it is possible to slow down the stream leaving the pressure zone by allowing it to hit an impact surface which reduces the size requirements for the plant.

It is, however, preferred that the outflowing jet of microspheres is slowed down completely in the surrounding air, before the product is collected, by directing the jet upwards or horizontally. Due to the high initial velocity the particles will then cover a distance of several meters. To limit the transportation distance it can then be suitable to arrange an air flow directed towards the stream, for example by directing the particle stream upwards in a shaft meeting an air stream directed downwards.

The velocity of the particle stream leaving the pressure zone orifice shall be high. Suitably the velocity is above 1 m/s, better above 5 m/s and preferably also above 10 m/s. Although it is possible to partially accelerate the flow, and also change the direction of the flow, by an addition of for example compressed air at the orifice, it is preferred that the stream is accelerated mainly or purely by the pressure drop. This means that the pressure difference at the orifice shall be selected so that the desired velocity is obtained. It is also preferred that the initial direction of the flow is determined by the pressure drop, i.e. is perpendicular to the orifice, and also preferred that the direction is maintained until the flow mixes in free gas volumes.

An apparatus for carrying out the process can have a simple design comprising a conduit with pumping means for continuous transportation of the slurry of unexpanded microspheres to the pressure zone, corresponding means for continuous introduction of steam and optionally also means for introduction of inert gas. The supply of one stream can be used for pumping in another by using venturi valves with ejector effect. The pressure zone is suitably a pipe of sufficient length to give the desired residence time. The pipe should be smooth and not contain any devices causing severe pressure drops by friction losses. The pipe may end with a restriction of some kind which gives a rapid pressure drop. Optionally the pipe can be extended some distance after the restriction, to direct the particle stream. An opening having a diameter of for example 0.95 to 0.1 times the inner diameter of the pipe, and particularly between 0.9 and 0.6 times this, can be used as restriction.

Using the process of the invention it is possible to produce microspheres having a true density of between 10 and 100 kg/m$^3$ and particularly between 20 and 40 kg/m$^3$. Any low dry content of the product can of course be made but a high dry content is generally desired. Using the process of the invention it is possible to achieve a dry content of the final product above 10 percent by weight, and also above 15 percent by weight without a special drying step.

EXAMPLE

Unexpanded microspheres of vinylidene chloride/acrylonitrile containing isobutane as blowing agent (Expancel ®), in the form of an aqueous dispersion having a dry content of 20.3 percent by weight, were fed to a pressure zone at a rate of 3 l/min. together with air and steam in a ratio of 0.3. The pressurezone was a pipe having a length of about 0.5 meters and an inner diameter of 15.7 mm. At the end of the pipe there was a restriction with an opening of 12.9 mm. After the restriction the pipe was extended for an additional 0.5 meter. The overpressure in the pipe was about 2.9 atm (0.29 MPa) and the temperature about 103° C. After free exit into air the particles were collected and found to have a dry content of 15.8 percent by weight and a density (dry) of 32.9 kg/m$^3$. Microscopic investigation showed that the product was completely free from agglomerates.

We claim:

1. A method for expanding expandable organic thermoplastic microspheres containing a blowing agent, able to be vaporized upon heating, comprising the steps of (a) providing a pumpable slurry of the unexpanded microspheres in an inert liquid, (b) feeding the slurry into a pressure zone in which a pressure above the surrounding pressure is maintained, (c) feeding to the pressure zone steam of a temperature and in an amount sufficient for heating the microspheres above the vaporization temperature of the blowing agent, at the pressure in the pressure zone, to thereby partially expand the microspheres, (d) allowing the partially expanded microspheres to leave the pressure zone under a pressure drop whereby the spheres are further expanded and accelerated into a stream with a velocity of at least 1 meter per second, (e) injecting the accelerated stream into gas volume whereby the stream is disintegrated and cooled, and (f) separating essentially uniformly expanded and non-agglomerated spheres from the gas.

2. The method of claim 1 wherein the pressure drop at the outflow of the slurry exceeds 0.05 MPa.

3. The method of claim 1 wherein the pressure drop at the outflow of the slurry exceeds 0.1 MPa.

4. The method of claim 1 wherein the content of microspheres in the slurry fed to the pressure zone is between 5 and 45 percent by weight.

5. The method of claim 4 wherein the content of microspheres is between 5 and 45 percent by weight.

6. The method of claim 1 wherein the initial dry content and the amount of steam are selected to give a microspheres content in the outgoing mixture exceeding 10 percent by weight.

7. The method of claim 6 wherein the microsphere content in the outgoing mixture exceeds 15 percent by weight.

8. The method of claim 1 wherein an inert gas is fed into the pressure zone.

* * * * *